US009183869B2

(12) United States Patent
Onoue

(10) Patent No.: US 9,183,869 B2
(45) Date of Patent: Nov. 10, 2015

(54) PERPENDICULAR MAGNETIC RECORDING MEDIUM AND METHOD OF MANUFACTURING PERPENDICULAR MAGNETIC RECORDING MEDIUM

(71) Applicant: WD Media (Singapore) Pte. Ltd., Irvine, CA (US)

(72) Inventor: Takahiro Onoue, Singapore (JP)

(73) Assignee: WD Media (Singapore) Pte. Ltd., Singapore (SG)

( * ) Notice: Subject to any disclaimer, the term of this patent is extended or adjusted under 35 U.S.C. 154(b) by 181 days.

(21) Appl. No.: 14/051,414

(22) Filed: Oct. 10, 2013

(65) Prior Publication Data

US 2014/0044992 A1 Feb. 13, 2014

Related U.S. Application Data

(62) Division of application No. 12/934,935, filed as application No. PCT/JP2009/056050 on Mar. 26, 2009, now Pat. No. 8,580,410.

(30) Foreign Application Priority Data

Mar. 26, 2008 (JP) ................. 2008-082250

(51) Int. Cl.
G11B 5/66 (2006.01)
G11B 5/85 (2006.01)
G11B 5/65 (2006.01)

(52) U.S. Cl.
CPC .. *G11B 5/85* (2013.01); *G11B 5/65* (2013.01); *G11B 5/66* (2013.01)

(58) Field of Classification Search
None
See application file for complete search history.

(56) References Cited

U.S. PATENT DOCUMENTS 6,468,670 B1 10/2002 Ikeda et al.
7,494,726 B2 2/2009 Watanabe et al.
(Continued)

FOREIGN PATENT DOCUMENTS

JP 63-014310 1/1998
JP 2001-256632 9/2001
(Continued)

*Primary Examiner* — Kevin Bernatz

(57) ABSTRACT

A perpendicular magnetic recording medium 100 having a magnetic recording layer 122, wherein a particle diameter of crystal grains in layer 122 improves a SNR while a high coercive force is maintained. There also is at least a ground layer 118, a first magnetic recording layer 122a, and a second magnetic recording layer 122b in this order on a disk base 110. The first layer 122a and the second layer 122b are ferromagnetic layers, each having a granular structure in which a grain boundary part made of a non-magnetic substance is formed between crystal grains each grown in a columnar shape, and A<B when an average particle diameter of the crystal grains in the first magnetic recording layer 122a is taken as A nm and an average particle diameter of the crystal grains in the second magnetic recording layer 122b is taken as B nm.

18 Claims, 4 Drawing Sheets

(56) References Cited

U.S. PATENT DOCUMENTS

| | | |
|---|---|---|
| 7,582,368 B2 | 9/2009 | Berger et al. |
| 8,076,013 B2 | 12/2011 | Sonobe et al. |
| 8,580,410 B2 | 11/2013 | Onoue |
| 2004/0185308 A1 | 9/2004 | Koda et al. |
| 2005/0153169 A1 | 7/2005 | Watanabe et al. |
| 2005/0186450 A1 | 8/2005 | Takenoiri et al. |
| 2006/0222902 A1 | 10/2006 | Mukai |
| 2009/0117408 A1 | 5/2009 | Umezawa et al. |
| 2011/0097603 A1 | 4/2011 | Onoue |

FOREIGN PATENT DOCUMENTS

| | | |
|---|---|---|
| JP | 2002-092865 | 3/2002 |
| JP | 2004-259423 | 9/2004 |
| JP | 2006-309919 | 11/2006 |
| WO | 2007114401 | 10/2007 |
| WO | 2007114402 | 10/2007 |

FIG. 3

| | NON-MAGNETIC SUBSTANCE | INTERGRANULAR DISTANCE | SNR |
|---|---|---|---|
| SECOND MAGNETIC RECORDING LAYER 122b | $SiO_2 + TiO_2$ | LARGE | ◎ |
| FIRST MAGNETIC RECORDING LAYER 122a | $Cr_2O_3 + SiO_2$ | SMALL | |
| SECOND MAGNETIC RECORDING LAYER 122b | $SiO_2$ | LARGE | × |
| FIRST MAGNETIC RECORDING LAYER 122a | $Cr_2O_3 + SiO_2$ | SMALL | |
| SECOND MAGNETIC RECORDING LAYER 122b | $SiO_2$ | SMALL | × |
| FIRST MAGNETIC RECORDING LAYER 122a | $Cr_2O_3 + SiO_2$ | LARGE | | ness of the Problem

PERPENDICULAR MAGNETIC RECORDING MEDIUM AND METHOD OF MANUFACTURING PERPENDICULAR MAGNETIC RECORDING MEDIUM

CROSS REFERENCE TO RELATED APPLICATIONS

This application is a Divisional of U.S. patent application Ser. No. 12/934,935 filed Dec. 27, 2010 claiming priority based on International Application No. PCT/JP2009/056050 filed Mar. 26, 2009, claiming priority based on Japanese Patent Application No. 2008-082250, filed on Mar. 26, 2008, the disclosures of which are incorporated herein by reference in their entirety.

TECHNICAL FIELD

The present invention relates to a perpendicular magnetic recording medium implemented on an HDD (hard disk drive) of a perpendicular magnetic recording type or the like, and a method of manufacturing a perpendicular magnetic recording medium.

BACKGROUND ART

With an increase in capacity of information processing in recent years, various information recording technologies have been developed. In particular, the surface recording density of an HDD using magnetic recording technology is continuously increasing at an annual rate of approximately 100%. In recent years, an information recording capacity exceeding 160 GB per one magnetic disk with a 2.5-inch diameter for use in an HDD or the like has been desired. To fulfill such demands, an information recording density exceeding 250 Gbits per one square inch is desired to be achieved.

To attain a high recording density in a magnetic disk for use in an HDD or the like, a magnetic disk of a perpendicular magnetic recording type has been suggested in recent years. In a conventional in-plane magnetic recording type, the axis of easy magnetization of a magnetic recording layer is oriented in a plane direction of a base surface. In the perpendicular magnetic recording type, by contrast, the axis of easy magnetization is adjusted so as to be oriented in a direction perpendicular to the base surface.

For example, Patent Document 1 discloses a technology regarding a perpendicular magnetic recording medium configured to have a ground layer, a Co-type perpendicular magnetic recording layer, and a protective layer in this order formed on a substrate. Also, Patent Document 2 discloses a perpendicular magnetic recording medium having a structure attached with an artificial lattice film continuous layer (exchange coupling layer) exchange-coupled to a particulate recording layer.

In the perpendicular magnetic recording type, compared with the in-plane recording type, a thermal fluctuation phenomenon can be suppressed, and therefore the perpendicular magnetic recording type is suitable for increasing the recording density.

Also, conventionally, for the purpose of improving a coercive force Hc and a Signal-Noise Ratio (SNR), a structure in which a magnetic recording layer is formed of two layers has been suggested. For example, Patent Document 3 discloses a configuration in which, with a magnetic recording layer being formed of two layers, one recording layer on a base side has a composition containing CoCrPtTa and the other recording layer on a side away from the side has a composition containing CoCrPtB.

Patent Document 1: Japanese Unexamined Patent Application Publication No. 2002-92865
Patent Document 2: U.S. Pat. No. 6,468,670
Patent Document 3: Japanese Unexamined Patent Application Publication No. 2001-256632

DISCLOSURE OF INVENTION

Problems to be Solved by the Invention

As described above, for achieving a higher recording density, the coercive force Hc is required to be improved. To improve the coercive force Hc, a method of making the film thickness of the magnetic recording layer thicker can be thought. When the film thickness is made thicker, however, the SNR is decreased.

To get around this, the inventors of the present application found that the magnetic recording layer is configured to have a two-layer structure and the amount of a non-magnetic substance forming a grain boundary of the two-layer magnetic recording layer (the ratio with respect to a magnetic substance) is appropriately controlled, thereby improving the SNR while improving the coercive force Hc.

However, as a result of detailed studies about the magnetic recording layer of a two-layer structure, the inventors of the present application found that the coercive force Hc and the SNR are not necessarily determined only by the composition or amount of the non-magnetic substance. That is, it was found that, even if the composition (material and ratio) of the crystal grains formed of a magnetic substance and that of the grain particle formed of a non-magnetic substance are the same, the SNR varies based on another factor.

The present invention has been devised in view of the above problem of the magnetic recording layer. An object of the present invention is to provide a perpendicular magnetic recording medium including a magnetic recording layer, the medium in which a particle diameter of crystal grains in the magnetic recording layer of a two-layer structure is so designed as to improve an SNR while a high coercive force is maintained, and a method of manufacturing a perpendicular magnetic recording medium.

Means for Solving the Problem

To solve the above problem, as a result of diligent studies by the inventors of the present invention, it was found that, with the particle diameters of crystal grains for each layer in a magnetic recording layer formed with two layers having a predetermined relation, the SNR can further be improved, thereby completing the present invention.

That is, to solve the above problem, in a typical structure of a perpendicular magnetic recording medium according to the present invention, the perpendicular magnetic recording medium includes at least a ground layer, a first magnetic recording layer, and a second magnetic recording layer in this order on a base, wherein the first magnetic recording layer and the second magnetic recording layer are ferromagnetic layers of a granular structure in which grain boundary parts made of a non-magnetic substance are each formed between crystal grains each grown in a columnar shape, and $A<B$ when an average particle diameter of the crystal grains in the first magnetic recording layer is taken as $A$ nm and an average particle diameter of the crystal grains in the second magnetic recording layer is taken as $B$ nm.

With the particle diameter of the crystal grains of the first magnetic recording layer being smaller than the particle diameter of the crystal grains of the second magnetic recording layer, the crystal grains can be made finer in the first magnetic recording layer, and the orientation of the crystal grains can be improved in the second magnetic recording layer. Making the crystal grains finer and improving the orientation have a trade-off relation. Therefore, with the above structure, the magnetic recording layers can play the respective roles, and it is thus possible to improve the SNR while maintaining a high coercive force Hc.

A ratio between the average particle diameter of the crystal grains in the first magnetic recording layer and the average particle diameter of the crystal grains in the second magnetic recording layer is preferably 0.8<A/B<1.

With this, the SNR can be optimally improved. Note that, when the ratio between the average particle diameter of the crystal grains in the first magnetic recording layer and the average particle diameter of the crystal grains in the second magnetic recording layer is not within the above range, a role of making each magnetic recording layer finer and a role of improving orientation cannot be shared, and therefore an improvement of the SNR cannot be expected even if two magnetic recording layers are provided.

A total thickness of the first magnetic recording layer and the second magnetic recording layer is preferably equal to or smaller than 15 nm.

The film thickness of the first magnetic recording layer is preferably equal to or smaller than 5 nm and, desirably 3 nm to 4 nm. This is because, if the thickness is smaller than 3 nm, composition separation of the second magnetic recording layer cannot be promoted and, if the thickness is larger than 4 nm, a R/W characteristic (read/write characteristic) is degraded. The film thickness of the second magnetic recording layer is preferably equal to or larger than 5 nm and, desirably 7 nm to 15 nm. This is because a sufficient coercive force cannot be obtained if the film thickness is smaller than 7 nm and a high inverted-magnetic-domain nucleation magnetic field Hn (with a large absolute value) cannot be obtained if the film thickness is larger than 15 nm.

The non-magnetic substance may include any of chrome, oxygen, or an oxide, or a plurality thereof.

The non-magnetic substance is a substance in which a grain boundary part can be formed around magnetic particles so that an exchange interaction operation between crystal grains (magnetic particles or magnetic grains) is suppressed or interrupted, and can be any as long as it is a non-magnetic substance that cannot be incorporated into cobalt (Co). Examples can include chrome (Cr), oxygen (O), and oxides, such as silicon oxide ($SiO_2$), chrome oxide ($Cr_2O_3$), titanium oxide ($TiO_2$), zircon oxide ($ZrO_2$), tantalum oxide ($Ta_2O_5$), niobium oxide ($Nb_2O_5$), and boron oxide ($B_2O_3$).

The oxide preferably includes one or a plurality of oxides selected from the group of $SiO_2$, $TiO_2$, $Cr_2O_3$, $Ta_2O_5$, $Nb_2O_5$, $B_2O_3$, and $ZrO_2$. In particular, $SiO_2$ has an effect of promoting finer and more isolated (separated from an adjacent magnetic grain) magnetic grains, and $TiO_2$ has an effect of suppressing dispersion in particle diameter of the crystal grains. Also, $Cr_2O_3$ can increase the coercive force Hc. Furthermore, by combining these oxides for segregation over the grain boundaries of the magnetic recording layer, both of the advantages can be enjoyed.

The non-magnetic substance included in the second magnetic recording layer preferably includes one or a plurality of oxides selected from the group of $SiO_2$, $TiO_2$, $Cr_2O_3$, $Ta_2O_5$, $Nb_2O_5$, $B_2O_3$, and $ZrO_2$. With this, the grain boundary parts can be reliably formed, and the crystal grains can be clearly separated. Therefore, the SNR can be improved.

To solve the above problem, in a typical structure of a method of manufacturing a perpendicular magnetic recording medium according to the present invention, the perpendicular magnetic recording medium includes at least a ground layer, a first magnetic recording layer, and a second magnetic recording layer in this order on a base, wherein, as the first magnetic recording layer, a magnetic target is used that includes, in a composition, any of chrome, oxygen, or an oxide, or a plurality of oxides, and a gas pressure of approximately 0.5 Pa and a power of approximately 100 to approximately 700 W are set, thereby forming a ferromagnetic layer of a granular structure in which non-magnetic grain boundary parts are formed each between crystal grains each grown in a columnar shape, a magnetic target is used that includes, in a composition, any of chrome, oxygen, or an oxide, or a plurality of oxides, and a gas pressure of approximately 0.5 Pa and a power of approximately 100 to approximately 1000 W are set, thereby forming, as the second magnetic recording layer, a ferromagnetic layer of a granular structure in which non-magnetic grain boundary parts are formed each between crystal grains each grown in a columnar shape, and A<B when an average particle diameter of the crystal grains in the first magnetic recording layer is taken as A nm and an average particle diameter of the crystal grains in the second magnetic recording layer is taken as B nm.

Components and description thereof based on a technical idea of the perpendicular magnetic recording medium described above and their description are also applicable to a method of manufacturing the perpendicular magnetic recording medium.

Effect of the Invention

In the perpendicular magnetic recording medium according to the present invention, it is possible to include a magnetic recording layer in which a particle diameter of crystal grains in the magnetic recording layer of a two-layer structure is so designed as to improve an SNR while a high coercive force is maintained.

BRIEF DESCRIPTION OF DRAWINGS

FIG. 3 A descriptive diagram for describing a relation between an average particle diameter of magnetic particles of a first magnetic recording layer and an average particle diameter of magnetic particles of a second magnetic recording layer and an SNR relation therebetween.

DESCRIPTION OF REFERENCE NUMERALS

Figure 1:
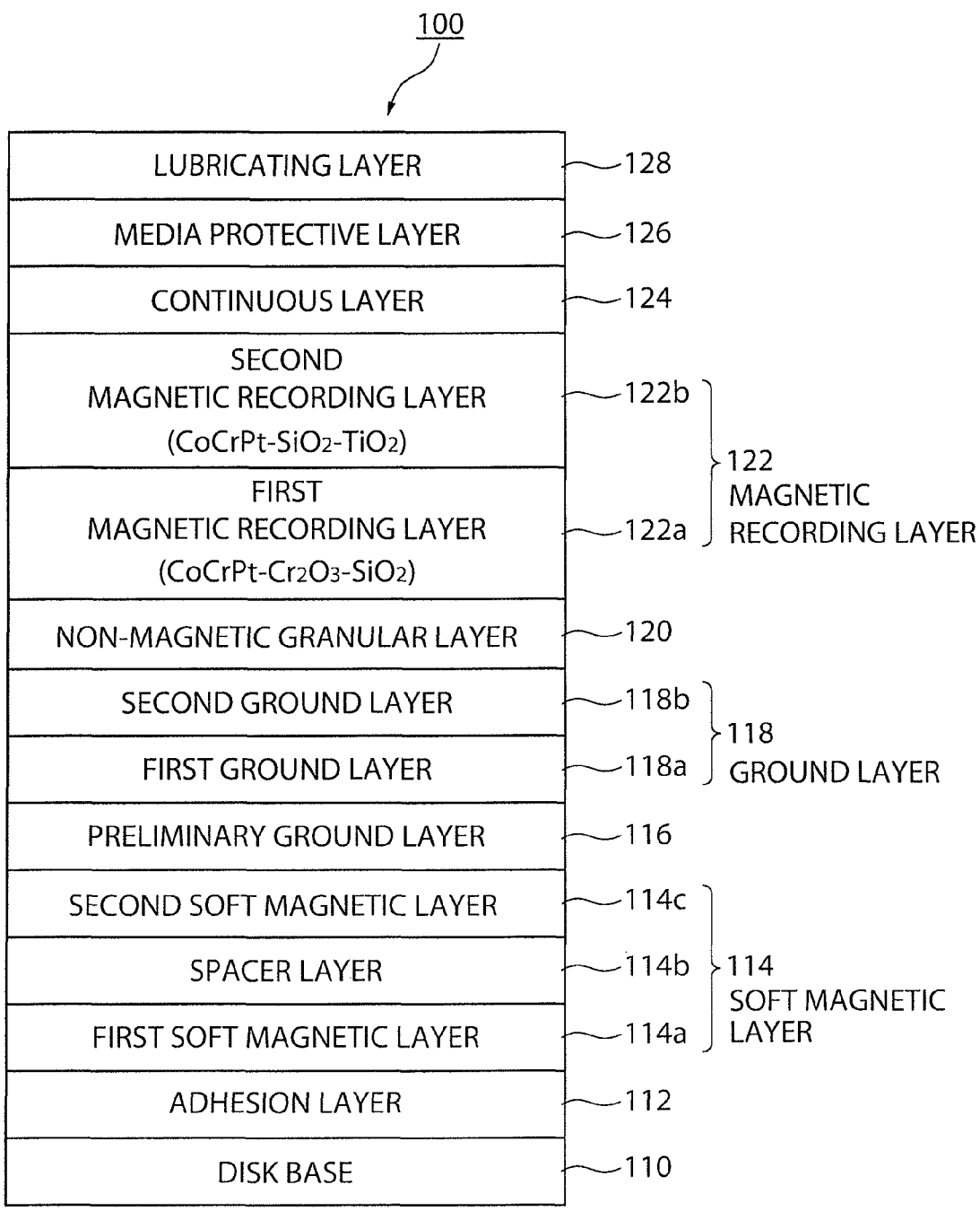
FIG. 1 A diagram for describing the structure of a perpendicular magnetic recording medium according to an embodiment.

100 . . . perpendicular magnetic recording medium
110 . . . disk base
112 . . . adhesion layer
114 . . . soft magnetic layer 114a . . . first soft magnetic layer
114b . . . spacer layer
114c . . . second soft magnetic layer
116 . . . preliminary ground layer
118 . . . ground layer
118a . . . first ground layer
118b . . . second ground layer
120 . . . non-magnetic granular layer
122 . . . magnetic recording layer
122a . . . first magnetic recording layer
122b . . . second magnetic recording layer
124 . . . continuous layer
126 . . . medium protective layer
128 . . . lubricating layer

BEST MODE FOR CARRYING OUT THE INVENTION

In the following, with reference to the attached drawings, preferred embodiments of the present invention are described in detail. The dimensions, materials, and others such as specific numerical values shown in these embodiments are merely examples so as to facilitate understanding of the invention, and are not meant to restrict the present invention unless otherwise specified. Note that, in the specification and drawings, components having substantially the same functions and structures are provided with the same reference characters and are not redundantly described, and components not directly relating to the present invention are not shown in the drawings.

EMBODIMENTS

An embodiment of the method of manufacturing a perpendicular magnetic recording medium according to the present invention is described. FIG. 1 is a diagram for describing the structure of a perpendicular magnetic recording medium 100 according to the present embodiment. The perpendicular magnetic recording medium 100 depicted in FIG. 1 is configured of a disk base 110, an adhesion layer 112, a first soft magnetic layer 114a, a spacer layer 114b, a second soft magnetic layer 114c, a preliminary ground layer 116, a first ground layer 118a, a second ground layer 118b, a non-magnetic granular layer 120, a first magnetic recording layer 122a, a second magnetic recording layer 122b, a continuous layer 124, a medium protective layer 126, and a lubricating layer 128. Note that the first soft magnetic layer 114a, the spacer layer 114b, and the second soft magnetic layer 114 together form a soft magnetic layer 114. The first ground layer 118a and the second ground layer 118b together form a ground layer 118. The first magnetic recording layer 122a and the second magnetic recording layer 122b together form a magnetic recording layer 122.

As described below, in the perpendicular magnetic recording medium 100 shown in the present embodiment, either or both of the first magnetic recording layer 122a and the second magnetic recording layer 122b of the magnetic recording layer 122 contain oxides of a plurality of types (hereinafter referred to as a "composite oxide"), thereby causing segregation of the composite oxide in a non-magnetic grain boundary.

For the disk base 110, a glass disk molded in a disk shape by direct-pressing amorphous aluminosilicate glass can be used. Note that the type, size, thickness, and others of the glass disk are not particularly restricted. A material of the glass disk can be, for example, aluminosilicate glass, soda lime glass, soda alumino silicate glass, aluminoborosilicate glass, borosilicate glass, quartz glass, chain silicate glass, or glass ceramic, such as crystallized glass. This glass disk is sequentially subjected to grinding, polishing, and chemical strengthening, thereby allowing the smooth, non-magnetic disk base 110 made of chemically-strengthened glass disk to be obtained.

On the disk base 110, the adhesion layer 112 to the continuous layer 124 are sequentially formed by DC magnetron sputtering, and the medium protective layer 126 can be formed by CVD. Then, the lubricating layer 128 can be formed by dip coating. Note that, in view of high productivity, using an in-line-type film forming method is also preferable. In the following, the structure of each layer and its manufacturing method are described.

The adhesion layer 112 is an amorphous ground layer formed in contact with the disk base 110, and includes a function of increasing a peel strength between the soft magnetic layer 114 formed thereon and the disk base 110. When the disk base 110 is made of amorphous glass, the adhesion layer 112 is preferably an amorphous alloy film so as to comply with that amorphous glass surface.

As the adhesion layer 112, for example, a CrTi-type amorphous layer can be selected.

The soft magnetic layer 114 is a layer in which a magnetic path is temporarily formed at the time of recording so as to let a magnetic flux pass through a recording layer in a perpendicular direction in a perpendicular magnetic recording type. By interposing the non-magnetic spacer layer 114b between the first soft magnetic layer 114a and the second soft magnetic layer 114c, the soft magnetic layer 114 can be configured to include Antiferro-magnetic exchange coupling (AFC). With this, magnetizing directions of the soft magnetic layer 114 can be aligned with high accuracy along the magnetic path (magnetic circuit), the number of perpendicular components in the magnetizing direction becomes extremely small, and therefore noise occurring from the soft magnetic layer 114 can be reduced. As the composition of the first soft magnetic layer 114a and the second soft magnetic layer 114c, a cobalt-type alloy, such as CoTaZr; a Co—Fe-type alloy, such as CoCrFeB; a Ni—Fe-type alloy having a [Ni—Fe/Sn]n multilayered structure or the like can be used.

The preliminary ground layer 116 is a non-magnetic alloy layer, and includes an operation of protecting the soft magnetic layer 114 and a function of orienting in a disk perpendicular direction an easy axis of magnetization of a hexagonal close-packed structure (hcp structure) included in the ground layer 118 formed on the preliminary ground layer. In the preliminary ground layer 116, a (111) surface of a face-centered cubic structure (fcc structure) or a (110) surface of a body-centered cubic structure (bcc structure) are preferably parallel to a main surface of the disk base 110. Also, the preliminary ground layer may have a structure in which these crystal structures and amorphous are mixed. As a material of the preliminary ground layer 116, a selection can be made from Ni, Cu, Pt, Pd, Zr, Hf, Nb, and Ta. Furthermore, an alloy including any of these metals as a main element and any one or more additional elements from among Ti, V, Ta, Cr, Mo, and W may be used. For example, NiW, CuW, or CuCr can be suitably selected as an fcc structure, and Ta can be suitably selected as a bcc structure.

The ground layer 118 has a hcp structure, and has an operation of growing crystals of the hcp structure of the magnetic recording layer 122 as a granular structure. Therefore, as the crystal orientation of the ground layer 118 is higher, that is, a (0001) surface of a crystal of the ground layer 118 is more parallel to the main surface of the disk base 110, the orientation of the magnetic recording layer 122 can be improved. As a material of the ground layer 118, Ru is typical. Other than that, a selection can be made from RuCr and RuCo. Ru has a hcp structure, and a lattice space of the crystal is similar to that of Co. Therefore, the magnetic recording layer 122 having Co as a main component can be oriented in good condition.

When the ground layer 118 is made of Ru, by changing the gas pressure at the time of sputtering, a two-layer structure made of Ru can be achieved. Specifically, when the second ground layer 118b on an upper-layer side is formed, the gas pressure of Ar is made higher than that when the first ground layer 118a on a lower-layer side is formed. When the gas pressure is made higher, a free traveling distance of Ru ions to be sputtered is shortened, and therefore the film-forming speed becomes slow, thereby improving the crystal separation ability. Also, with a high pressure, the size of the crystal lattice becomes smaller. Since the size of the crystal lattice of Ru is larger than that of the crystal lattice of Co, when the crystal lattice of Ru is made smaller, it becomes closer to that of Co, thereby further improving the crystal orientation of the Co granular layer.

The non-magnetic granular layer 120 is a non-magnetic granular layer. By forming a non-magnetic granular layer on the hcp crystal structure of the ground layer 118 and, on that layer, making a granular layer of the first magnetic recording layer 122a grown, an operation of separating the magnetic granular layer from a stage of initial growth (leading) is provided. The composition of the non-magnetic granular layer 120 can be a granular structure by forming a grain boundary by causing segregation of non-magnetic substance between non-magnetic crystal grains made of a Co-type alloy. In particular, CoCr—$SiO_2$ and CoCrRu—$SiO_2$ can be suitably used and, furthermore, in place of Ru, Rh (rhodium), Pd (palladium), Ag (silver), Os (osmium), Ir (iridium), and Au (gold) can also be used. Still further, the non-magnetic substance is a substance in which a grain boundary part can be formed around magnetic particles so that an exchange interaction operation between magnetic particles (magnetic grains) is suppressed or interrupted, and can be any as long as it is a non-magnetic substance that is not incorporated into cobalt (Co). Examples can include silicon oxide (SiOx), chrome (Cr), chrome oxide ($CrO_2$), titanium oxide ($TiO_2$), zircon oxide ($ZrO_2$), and tantalum oxide ($Ta_2O_5$).

The magnetic recording layer 122 is a ferromagnetic layer having a granular structure in a columnar shape in which a grain boundary is formed by causing segregation of a non-magnetic substance around magnetic particles made of a hard magnetic body selected from a Co-type alloy, a Fe-type alloy, and a Ni-type alloy. By providing the non-magnetic granular layer 120, these magnetic particles can make an epitaxial growth continuously from their granular structure. In the present embodiment, the magnetic recording layer is configured of the first magnetic recording layer 122a and the second magnetic recording layer 122b different in composition and film thickness. In both of the first magnetic recording layer 122a and the second magnetic recording layer 122b, as a non-magnetic substance, an oxide, such as $SiO_2$, $Cr_2O_3$, $TiO_2$, $B_2O_3$, and $Fe_2O_3$; a nitride, such as BN; or a carbide, such as $B_4C_3$ can be suitably used.

In the present embodiment, A<B when an average particle diameter of the magnetic particles (crystal grains) in the first magnetic recording layer 122a is taken as A nm and an average particle diameter of the magnetic particles (crystal grains) in the second magnetic recording layer 122b is taken as B nm. With the particle diameter of the magnetic particles of the first magnetic recording layer 122a being smaller than the particle diameter of the magnetic particles of the second magnetic recording layer 122b, the magnetic particles can be made finer in the first magnetic recording layer 122a, and the orientation of the magnetic particles can be improved in the second magnetic recording layer 122b. Making the magnetic particles finer and improving the orientation have a trade-off relation. Therefore, with the above structure, the magnetic recording layers 122 can play the respective roles, and it is thus possible to improve the SNR while maintaining a high coercive force Hc.

Still further, in the present embodiment, in either one or both of the first magnetic recording layer 122a and the second magnetic recording layer 122b, two or more non-magnetic substances can be used in a compounding manner. Here, although the type of non-magnetic substance contained is not restricted, $SiO_2$ and $TiO_2$ are in particular preferably included and, next, in place of/in addition to either one, $Cr_2O_3$ can be suitably used. For example, the first magnetic recording layer 122a can contain $Cr_2O_3$ and $SiO_2$, as an example of the composite oxide (oxides of a plurality of types), in a grain boundary part to form an hcp crystal structure of CoCrPt—$Cr_2O_3$—$SiO_2$. Also, for example, the second magnetic recording layer 122b can contain $SiO_2$ and $TiO_2$, as an example of the composite oxide, in a grain boundary part to form an hcp crystal structure of CoCrPt—$SiO_2$—$TiO_2$.

The continuous layer 124 is a magnetically continuous layer (also referred to as a continuous layer) in an in-plane direction on the magnetic recording layer 122 having a granular structure. Although the continuous layer 124 is not necessarily required, by providing this, in addition to a high-density recording property and a low-noise property of the magnetic recording layer 122, it is possible to enhance the inverted-magnetic-domain nucleation magnetic field Hn, improve the heat-resistant fluctuation characteristic, and improve the overwrite characteristic.

The medium protective layer 126 can be formed by forming a film out of carbon by CVD while keeping a vacuum state. The medium protective layer 126 is a protective layer for protecting the perpendicular magnetic recording layer from a shock of the magnetic head. In general, a carbon film formed by CVD has an improved film hardness compared with the one formed by sputtering, and therefore the perpendicular magnetic recording medium can be more effectively protected from a shock from the magnetic head.

The lubricating layer 128 can be formed by forming a film out of perfluoropolyether (PFPE) by dip coating. PFPE has a molecular structure in a long chain shape, and is coupled to an N atom on the surface of the medium protective layer 126 with high affinity. With this operation of the lubricating layer 128, a damage or loss of the medium protective layer 126 can be prevented even if the magnetic head makes contact with the surface of the perpendicular magnetic recording medium 100.

With the above manufacturing processes, the perpendicular magnetic recording medium 100 can be obtained. In the following, effectiveness of the present invention is described by using an example and comparative examples.

EXAMPLES AND EVALUATION

On the disk base 110, by using a vacuumed film forming device, the adhesion layer 112 to the continuous layer 124 were sequentially formed in an Ar atmosphere by DC magnetron sputtering. The adhesive layer 112 was of CrTi. In the soft magnetic layer 114, the composition of the first soft magnetic layer 114a and the second soft magnetic layer 114c was of FeCoTaZr, and the composition of the spacer layer 114b was of Ru. The composition of the preliminary ground layer 116 was of an NiW alloy with an fcc structure. In the ground layer 118, the first ground layer 118a was formed out of Ru under low-pressure Ar, and the second ground layer 118b was formed out of Ru under high-pressure Ar. The composition of the non-magnetic granular layer 120 was of non-magnetic CoCr—SiO$_2$. The magnetic recording layer 122 was formed with a structure in the example and comparative examples below. The composition of the continuous layer 124 was of CoCrPtB. As for the medium protective layer 126, a film was formed by using C$_2$H$_4$ and CN by CVD, and the lubricating layer 128 was formed by using PFPE by dip coating.

Figure 2A:
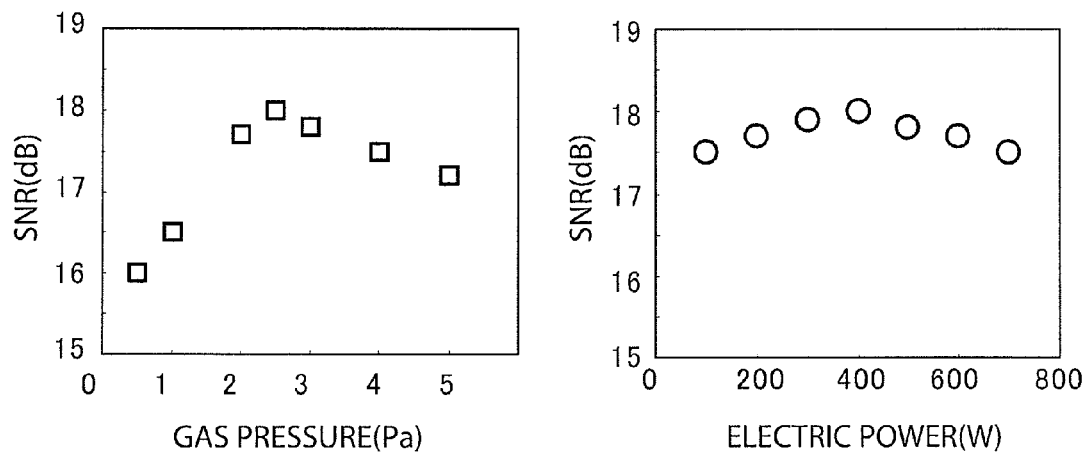
FIG. 2 A descriptive diagram for describing a relation between gas pressure and SNR and a relation between input power and SNR characteristic at the time of film-forming a magnetic recording layer.
Figure 2B:
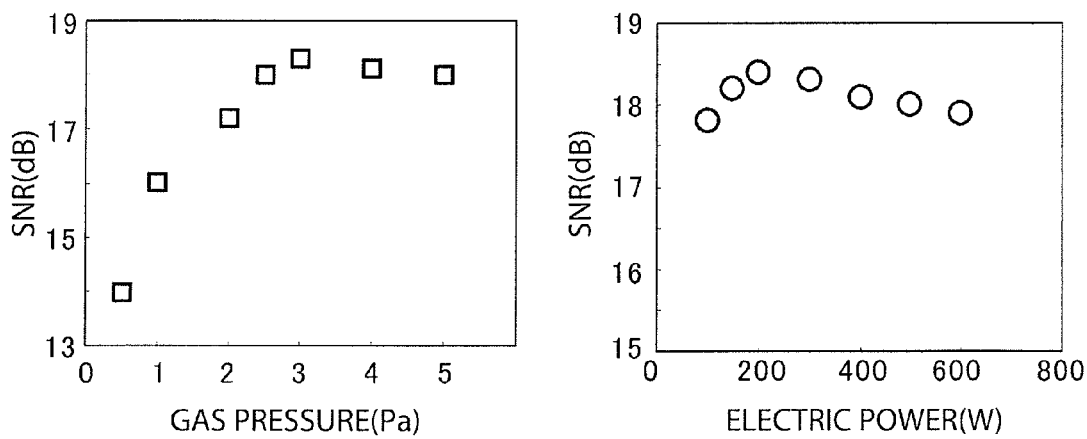

FIG. 2 is a descriptive diagram for describing a relation between gas pressure and SNR and a relation between input power and SNR at the time of forming the magnetic recording layer 122. In particular, FIG. 2(a) is a diagram showing a relation between a condition (gas pressure and input power) for forming the second magnetic recording layer 122b, and SNR, with a film thickness of the first magnetic recording layer 122a being fixed at 3 nm and an average particle diameter of the magnetic particles at 6 nm. FIG. 2(b) is a diagram showing a relation between a condition (gas pressure and input power) for forming the first magnetic recording layer 122a, and SNR, with a film thickness of the second magnetic recording layer 122b being fixed at 10 nm and an average particle diameter of the magnetic particles at 7 nm. Note that, in either case, a film-forming time is adjusted so that the product of the input power and the film-forming time is constant, thereby making the film thickness constant. In this case, in the first magnetic recording layer 122a, an hcp crystal structure of CoCrPt—Cr$_2$O$_3$—SiO$_2$ was formed by including Cr$_2$O$_3$ and SiO$_2$ as an example of a composite oxide. Also, in the second magnetic recording layer 122b, an hcp crystal structure of CoCrPt—SiO$_2$—TiO$_2$ was formed by including SiO$_2$ and TiO$_2$ as an example of a composite oxide.

As depicted in FIG. 2(a), in the second magnetic recording layer 122b, an optimum SNR can be obtained by forming a film at a gas pressure of 2.5 Pa and an input power of 400 W. The average particle diameter of the magnetic particles of the second magnetic recording layer 122b at this time can be measured by a Transmission Electron Microscope (TEM), and the results were such that the average particle diameter was 6.7 nm.

As depicted in FIG. 2(b), in the first magnetic recording layer 122a, an optimum SNR can be obtained by forming a film at a gas pressure of 3.0 Pa and an input power of 200 W. An average particle diameter of magnetic particles of the first magnetic recording layer 122a at this time can be measured by a transmission electron microscope, and was 6.5 nm.

In the following, it is assumed as a first example that the first magnetic recording layer 122a has an average particle diameter of the magnetic particles of 6 nm and the second magnetic recording layer 122b has an average particle diameter of the magnetic particles of 7 nm, that is, the first magnetic recording layer 122a<the second magnetic recording layer 122b regarding the average particle diameter of the magnetic particles. Also, it is assumed as a comparative example that the first magnetic recording layer 122a has an average particle diameter of the magnetic particles of 7 nm and the second magnetic recording layer 122b has an average particle diameter of the magnetic particles of 6 nm, that is, the first magnetic recording layer 122a>the second magnetic recording layer 122b regarding the average particle diameter of the magnetic particles.

FIG. 3 is a descriptive diagram for describing a relation between an average particle diameter of magnetic particles of the first magnetic recording layer 122a and an average particle diameter of magnetic particles of the second magnetic recording layer 122b and an SNR relation therebetween.

As depicted in FIG. 3, when the particle diameter of the magnetic particles included in the first magnetic recording layer 122a is smaller than the particle diameter of the magnetic particles included in the second magnetic recording layer 122b, a high SNR can be obtained, compared with the case in which the particle diameter of the magnetic particles included in the first magnetic recording layer 122a is larger than the particle diameter of the magnetic particles included in the second magnetic recording layer 122b.

Also, with the average particle diameter of the magnetic particles in the first magnetic recording layer 122a being smaller by approximately 1 nm than the average particle diameter of the magnetic particles in the second magnetic recording layer 122b (A/B≈(nearly equal)0.85 when the average particle diameter of the magnetic particles in the first magnetic recording layer 122a is taken as A and the average particle diameter of the magnetic particles in the second magnetic recording layer 122b is taken as B), the SNR can be optimally improved. Note that, as depicted in the comparison example, if a ratio (A/B) between the average particle diameter A of the magnetic particles in the first magnetic recording layer 122a and the average particle diameter B of the magnetic particles in the second magnetic recording layer 122b is 1.16, that is, equal to or larger than 1, a role of making each magnetic recording layer 122 finer and a role of improving orientation cannot be shared, and therefore an improvement of the SNR cannot be expected even if two magnetic recording layers 122 are provided.

With the aim of further improving the SNR, in a second embodiment, the first magnetic recording layer 122a was configured to contain Cr$_2$O$_3$ and SiO$_2$ as an example of a composite oxide to form an hcp crystal structure of CoCrPt—Cr$_2$O$_3$—SiO$_2$, and the second magnetic recording layer 122b was configured to contain SiO$_2$ and TiO$_2$ as an example of a composite oxide to form an hcp crystal structure of CoCrPt—SiO$_2$—TiO$_2$.

As depicted in FIG. 3, with the second magnetic recording layer 122b being formed so as to include a composite oxide of SiO$_2$ and TiO$_2$, characteristics of a plurality of oxides can be obtained. Therefore, noise was reduced by further making the magnetic grains of the magnetic recording layer 122 finer and more isolated, and also the SNR was able to be improved.

In particular, SiO$_2$ has an effect of promoting finer and more isolated magnetic grains, and TiO$_2$ has an effect of suppressing dispersion in particle diameter of the crystal grains. By combining these oxides for segregation over the grain boundary parts of the magnetic recording layer 122, both of the advantages can be enjoyed.

Figure 4:
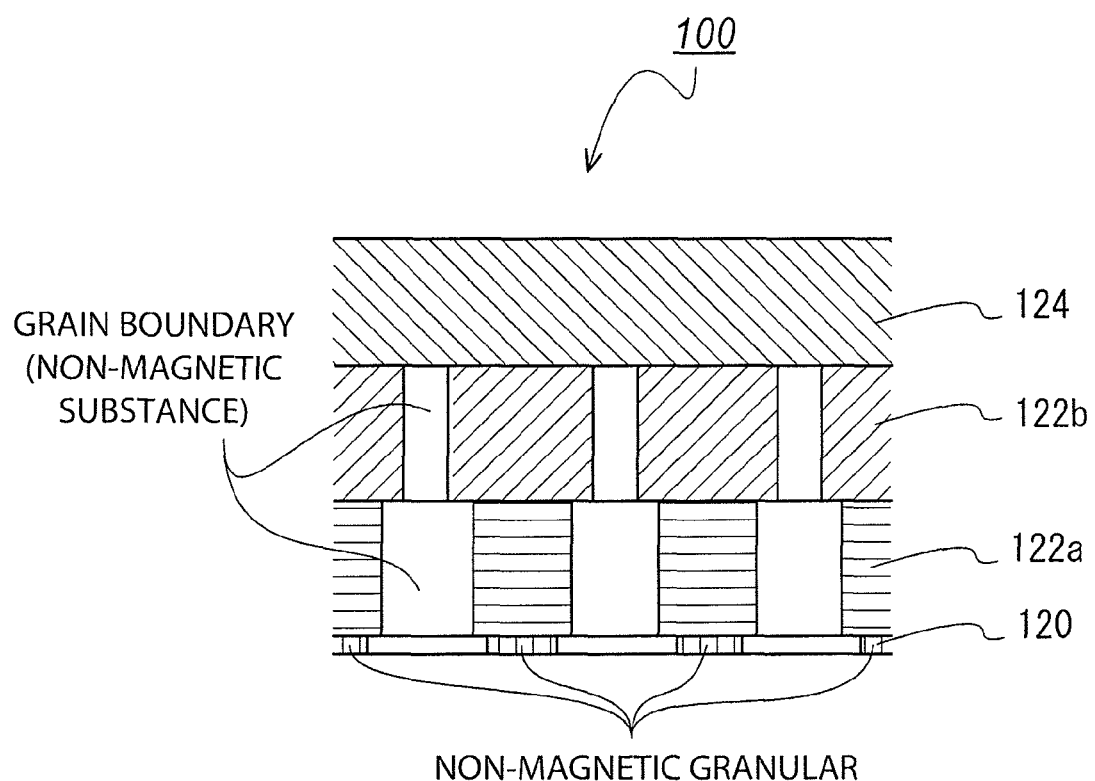
FIG. 4 A descriptive diagram for describing a perpendicular magnetic recording medium manufactured by using a method of manufacturing a perpendicular magnetic recording medium according to an embodiment.

FIG. 4 is a descriptive diagram for describing the perpendicular magnetic recording medium 100 manufactured by using the method of manufacturing a perpendicular magnetic recording medium according to the present embodiment.

As depicted in FIG. 4, the perpendicular magnetic recording medium 100 manufactured by using the method of manufacturing a perpendicular magnetic recording medium according to the present embodiment is formed so that the average particle diameter of the magnetic particles (crystal grains) in the first magnetic recording layer 122a is smaller than the average particle diameter of the magnetic particles (crystal grains) in the second magnetic recording layer 122b. Therefore, the magnetic particles can be made finer in the first magnetic recording layer 122a, and the orientation of the magnetic particles can be reliably controlled in the second magnetic recording layer 122b. Making the magnetic particles finer and improving the orientation have a trade-off relation. Therefore, with the above structure, the magnetic recording layers 122 can play the respective roles, and it is thus possible to improve the SNR while maintaining a high coercive force Hc.

Also, the present embodiment can be applied to the non-magnetic granular layer 120. That is, with the average particle diameter of the non-magnetic granular layer 120 being smaller than the average particle diameter of the first magnetic recording layer 122a, the average particle diameter of the first magnetic recording layer 122a can be effectively reduced, and the magnitude relation between crystal grains (magnetic particles) of the first magnetic recording layer 122a and the second magnetic recording layer 122b can be adjusted.

Furthermore, in the above embodiments and examples, it is described that the magnetic recording layer 122 is formed of two layers, that is, the first magnetic recording layer 122a and the second magnetic recording layer 122b. However, even when the magnetic recording layer 122 is formed of three or more layers, an effect similar to the above can be achieved by at least setting the average particle diameter of the magnetic particles of an upper magnetic recording layer 122 as being larger than the average particle diameter of the magnetic particles of a lower magnetic recording layer 122.

In the foregoing, the preferred examples of the present invention have been described with reference to the attached drawings. Needless to say, however, the present invention is not restricted by such examples. It is clear that the person skilled in the art can conceive various modification examples or corrected examples within a range described in the scope of claims for patent, and it is understood that these examples reasonably belong to the technological scope of the present invention.

INDUSTRIAL APPLICABILITY

The present invention can be used as a perpendicular magnetic recording medium implemented on an HDD (hard disk drive) of a perpendicular magnetic recording type or the like, and a method of manufacturing a perpendicular magnetic recording medium.

The invention claimed is:

1. A method of manufacturing a perpendicular magnetic recording medium including at least a ground layer, a non-magnetic granular layer, a first magnetic recording layer, and a second magnetic recording layer in this order on a base, comprising:
   forming the first magnetic recording layer using a magnetic target that includes, in a composition, any of chrome, oxygen, or an oxide, or a plurality of oxides, and a gas pressure of approximately 0.5 Pa and a power of approximately 100 to approximately 700 W are set, thereby forming a ferromagnetic layer of a granular structure in which non-magnetic grain boundary parts are formed each between crystal grains each grown in a columnar shape,
   forming the second magnetic recording layer using a magnetic target that includes, in a composition, any of chrome, oxygen, or an oxide, or a plurality of oxides, and where a gas pressure of approximately 0.5 Pa and a power of approximately 100 to approximately 1000 W are set, wherein the second magnetic recording layer is a ferromagnetic layer of a granular structure in which non-magnetic grain boundary parts are formed each between crystal grains each grown in a columnar shape, and wherein A<B when an average particle diameter of the crystal grains in the first magnetic recording layer is taken as A nm and an average particle diameter of the crystal grains in the second magnetic recording layer is taken as B nm, and
   the average particle diameter of the non-magnetic granular layer is smaller than the average particle diameter of the first magnetic recording layer.

2. The method of manufacturing a perpendicular magnetic recording medium according to claim 1, wherein
   a ratio between the average particle diameter of the crystal grains in the first magnetic recording layer and the average particle diameter of the crystal grains in the second magnetic recording layer is 0.8<A/B<1.

3. The method of manufacturing a perpendicular magnetic recording medium according to claim 1, wherein
   a total thickness of the first magnetic recording layer and the second magnetic recording layer is equal to or smaller than 15 nm.

4. The method of manufacturing a perpendicular magnetic recording medium according to claim 1, wherein a non-magnetic substance in which a grain boundary part can be formed includes any of chrome, oxygen, or an oxide, or a plurality thereof.

5. The method of manufacturing a perpendicular magnetic recording medium according to claim 4, wherein
   the oxide includes one or a plurality of oxides selected from the group of $SiO_2$, $TiO_2$, $Cr_2O_3$, $Ta_2O_5$, $Nb_2O_5$, $B_2O_3$, and $ZrO_2$.

6. The method of manufacturing a perpendicular magnetic recording medium according to claim 4, wherein
   an oxide included in the second magnetic recording layer includes one or a plurality of oxides selected from the group of $SiO_2$, $TiO_2$, $Cr_2O_3$, $Ta_2O_5$, $Nb_2O_5$, $B_2O_3$, and $ZrO_2$.

7. The method of manufacturing a perpendicular magnetic recording medium according to claim 2, wherein
   a total thickness of the first magnetic recording layer and the second magnetic recording layer is equal to or smaller than 15 nm.

8. The method of manufacturing a perpendicular magnetic recording medium according to claim 2, wherein a non-magnetic substance in which a grain boundary part can be formed includes any of chrome, oxygen, or an oxide, or a plurality thereof.

9. The method of manufacturing a perpendicular magnetic recording medium according to claim 3, wherein a non-magnetic substance in which a grain boundary part can be formed includes any of chrome, oxygen, or an oxide, or a plurality thereof.

10. The method of manufacturing a perpendicular magnetic recording medium according to claim 8 wherein
    the oxide includes one or a plurality of oxides selected from the group of $SiO_2$, $TiO_2$, $Cr_2O_3$, $Ta_2O_5$, $Nb_2O_5$, $B_2O_3$, and $ZrO_2$.

11. The method of manufacturing a perpendicular magnetic recording medium according to claim 9, wherein
    the oxide includes one or a plurality of oxides selected from the group of $SiO_2$, $TiO_2$, $Cr_2O_3$, $Ta_2O_5$, $Nb_2O_5$, $B_2O_3$, and $ZrO_2$.

12. The method of manufacturing a perpendicular magnetic recording medium according to claim 8, wherein
    an oxide included in the second magnetic recording layer includes one or a plurality of oxides selected from the group of $SiO_2$, $TiO_2$, $Cr_2O_3$, $Ta_2O_5$, $Nb_2O_5$, $B_2O_3$, and $ZrO_2$.

13. The method of manufacturing a perpendicular magnetic recording medium according to claim 9, wherein
an oxide included in the second magnetic recording layer includes one or a plurality of oxides selected from the group of $SiO_2$, $TiO_2$, $Cr_2O_3$, $Ta_2O_5$, $Nb_2O_5$, $B_2O_3$, and $ZrO_2$.

14. The method of manufacturing a perpendicular magnetic recording medium according to claim 1 wherein the non-magnetic granular layer includes non-magnetic crystal grains made of a Co alloy and a grain boundary part that comprises at least one of SiOx, Cr, $CrO_2$, $TiO_2$, $ZrO_2$ and $Ta_2O_5$.

15. A method of manufacturing a perpendicular magnetic recording medium including at least a ground layer, a first magnetic recording layer, a second magnetic recording layer, and at least a third magnetic recording layer, said layers being provided in this order on a base, comprising:
forming the first magnetic recording layer, the second magnetic recording layer and the at least a third magnetic recording layer as ferromagnetic layers of a granular structure in which grain boundary parts made of a non-magnetic substance are each formed between crystal grains each grown in a columnar shape, and the average particle diameter of the magnetic particles of an upper magnetic recording layer selected from the at least one third magnetic layer, relative to the base side is larger than the average particle diameter of the magnetic particles of a lower magnetic recording layer selected from only one but not the other of the first and second magnetic layers, relative to the upper magnetic recording layer.

16. A method of manufacturing a perpendicular magnetic recording medium including at least a ground layer, a first magnetic recording layer, a second magnetic recording layer, and at least a third magnetic recording layer, said layers being provided in this order on a base, comprising:
forming the first magnetic recording layer, the second magnetic recording layer and the at least a third magnetic recording layer as ferromagnetic layers of a granular structure in which grain boundary parts made of a non-magnetic substance are each formed between crystal grains each grown in a columnar shape,
wherein A<B when an average particle diameter of the crystal grains in the first magnetic recording layer is taken as A nm and an average particle diameter of the crystal grains in the second magnetic recording layer is taken as B nm, and
wherein the average particle diameter of the magnetic particles of an upper magnetic recording layer selected from the second and third magnetic layers, relative to the base side is larger than the average particle diameter of the magnetic particles of a lower magnetic recording layer selected from the first and second magnetic layers, relative to the upper magnetic recording layer, and
forming a non-magnetic granular layer between the ground layer and the first magnetic recording layer, the non-magnetic granular layer having an average particle diameter smaller than the average particle diameter of the first magnetic recording layer.

17. The method according to claim 16 wherein the non-magnetic granular layer includes non-magnetic crystal grains made of a Co alloy and a grain boundary part that comprises at least one of SiOx, Cr, $CrO_2$, $TiO_2$, $ZrO_2$ and $Ta_2O_5$.

18. The method according to claim 17 wherein the non-magnetic granular layer comprises Co, Cr, $SiO_2$ and at least one of Ru, Rh, Pd, Ag, Os, Ir and Au.

\* \* \* \* \*